Patented May 5, 1942

2,281,992

UNITED STATES PATENT OFFICE 2,281,992

IMPRESSION TAKING COMPOSITION

Paul Poetschke, Bronxville, N. Y.

No Drawing. Application July 19, 1940,
Serial No. 346,371

8 Claims. (Cl. 18—47)

This invention relates to impression taking composition suitable for making dental impressions and is herein disclosed in some detail as embodied in a free running powder adapted to readily be brought into plastic form by heating with water for a few minutes, the amount of water being varied in proportion according to the needs of the work to be done.

Materials known as hydrocolloids have been extensively used for making dental impressions but are open to serious inconveniences although they can be made to do good work.

One objection to these hydrocolloids arises from the fact that they required rather elaborate machinery for producing them, and, for that reason, could not be commercially produced in any ordinary dentist's office or dental mechanical laboratory. These hydrocolloids, however, had to contain definite amounts of water, some as low as 65%, others as high as 80%, when supplied for use.

The contained water tended to evaporate rapidly, and the materials tended to deteriorate, as from bacteriological attack, unless they were well protected. To obtain such protection, the materials were molded into cylindrical sticks and stored in containers, or were packed in collapsible tubes. It was often further needful to pack the containers and tubes in packages where they were covered with water-saturated absorbent material, or to coat the tubes with waterproof wax.

It was found impossible to dissolve agar-agar in water in any reasonable time if cut or flaked or granulated, and obtain the desired hydrocolloid, even after mixing in other materials. If the agar agar was very finely ground it lumped.

The collapsible tubes were expensive because the large water content necessitated a large tube, and the tubes necessarily had to contain enough for any normal batch used at one time, and additionally usually 6.5% to 15% more was wasted because it was not removable from the tube.

The tubes proved awkward to use because their contents needed to be heated uniformly before use. In ordinary work the tube contents had to be kneaded by kneading the hot tube, or the material put through a mixing gun which involved not only the trouble of using the gun but also the time required for cleaning and assembling the gun.

According to the present invention the foregoing and other objections and difficulties are avoided and a highly satisfactory dental impression material is provided which is clean to use, avoids waste, does not require special storage precautions, and which is easily adjusted in color, consistency and non-spoiling qualities to suit every artistic, medical and mechanical requirement.

According to the present invention agar agar is put into such a form that it dissolves with the desired rapidity yet does not lump, is mixed with a wax which softens at a proper temperature, yet also is present in such form that it distributes itself properly, other desirable ingredients may be incorporated with the agar agar, and also the final material may be easily adjusted in consistency to the desired working conditions by varying the amount of contained water.

The impression obtained in the composition retains its dimensions long enough to make satisfactory accurate plaster casts from it, and may be preserved a long time unchanged by wrapping in a damp cloth.

It was found unnecessary to grind the agar agar by any special process. To avoid the excessive amount of fine agar agar which tends to form lumps, it was only needful to granulate it so that, not all, but a large proportion passed through an 80-mesh sieve, separate that which passed that sieve and then further separate out the coarser material by sieving through a 110-mesh to 120-mesh sieve. The resulting fine product seems to be different from that sieved through the finer sieve direct, and it is found not to lump when put into water.

The fine agar agar thus obtained is mixed with finely divided wax of hardness to withstand storage at summer temperatures and melting in boiling water.

It is found that a suitable wax need not be very finely divided if it is grated so as to yield small, easily-fractured flakes which melt into small droplets in the hot water, so that it distributes itself uniformly.

A suitable hardened wax was obtained by melting together

| | |
|---|---|
| Paraffine wax (melting pt. 132° F.) | 84.5 |
| Gum damar | 11 |
| Carnauba wax | 4.50 |

For work similar to dental work the fine agar agar was mixed with about one-third of its weight of the grated wax in flakes. The mixed powder was heated in a double boiler in a fraction of its weight of water and found to be useful. If inorganic fillers are used less water is needed than with the wax and agar alone.

For dental purposes, and where a plaster of Paris cast was desired, it was advantageous to add a few percent of a plaster accelerator such as potash alum which caused the plaster to harden more rapidly at its surface and prevent adhesion of the agar material.

It was also found advantageous to add a finely divided inert opaque mineral filler such as zinc oxide, bentonite, or barium sulphate, which makes the composition opaque and more easily visible, and may equal half the weight of agar present.

Often a dental composition is made more attractive by coloring as by sienna and carmine. For dental work it is advisable to further add flavoring, such as a fraction of a percent of saccharine, and also an antiseptic such as chlorthymol and methyl salicylate.

It seems to improve the texture for dental work to also include a little soap such as castile soap, say one fifth as much as the alum with which it in part reacts.

A highly successful composition for dental work was made in the following proportions:

| | Per cent |
|---|---|
| Finely granulated agar | 50.00 |
| Grated wax | 18.40 |
| Zinc oxide | 10.00 |
| Bentonite | 10.00 |
| Barium sulphate | 3.40 |
| Potash alum | 5.40 |
| Castile soap | 1.00 |
| Sienna | .66 |
| Carmine | .24 |
| Chlorthymol | .20 |
| Soluble saccharine | .20 |
| Methyl salicylate | .50 |

The wax was prepared by melting the relatively hard gum damar, adding the relatively hard carnauba and when both were melted adding the softer paraffine wax, both hard and soft were useful, but 132° F. melting point was cheap and satisfactory.

The finished powder was best prepared by grinding together the sienna, carmine, chlorthymol and saccharine, and putting through a 100 mesh sieve. Then the powdered soap was mixed in, then the powdered barium sulphate and powdered alum, and the whole resieved.

Then the zinc oxide, bentonite and methyl-salicylate were mixed in. Then the sieved agar agar and the grated wax were added after being well mixed in a mechanical mixer without grinding, and the whole resieved in a sieve coarse enough to pass the wax.

The powder thus described in detail was used as follows:

2 ounces water were heated in a double boiler boiling vigorously. ½ ounce of the powder was stirred in and stirred for two minutes. The boiler was then covered and heated for ten minutes. Then it was removed from the heat and the mixture stirred until cooled for transfer to the impression tray.

The material thus prepared was found to be easily manipulatable at temperatures from 140° F. to 120° F. to make perfect impressions of undercut and fine and other surfaces, hard enough and elastic enough at body temperature to remove without breaking, so that the contour of undercuts was preserved, and also giving accurate plaster castings which did not adhere. It kept perfectly when covered with a wet cloth, was easily inspected because of the opaque fillers, and had a pleasing taste in a patient's mouth.

Having thus described certain embodiments of the invention, in some detail, what is claimed is:

1. A dry powder adapted to be heated with water to form an impression-taking composition, including principally agar agar sufficiently fine to dissolve readily but not to lump, and a lesser quantity of finely divided wax.

2. A dry powder adapted to be heated with water to form an impression-taking composition, including principally agar agar fine enough to pass a 110-mesh sieve but not fine enough to lump, and a lesser quantity of friable fine flakes of wax.

3. A dry powder adapted to be heated with water to form an impression-taking composition, including principally agar agar fine enough to pass a 110-mesh sieve but not fine enough to lump, and a lesser quantity of friable fine flakes of wax, said wax being harder than paraffine wax of 132° melting point.

4. A dry powder adapted to be heated with water to form an impression-taking composition including principally agar agar not fine enough to lump, about one-third as much friable flakes of wax, and a larger quantity of inert opaque mineral filler.

5. A dry powder adapted to be heated with water to form an impression-taking composition including principally agar agar not fine enough to lump, about one-third as much friable flakes of wax, and a larger quantity of inert opaque mineral filler, the wax being harder than 130° paraffine wax.

6. A dry powder adapted to be heated with water to form an impression-taking composition including principally agar agar not fine enough to lump, about one-third as much friable flakes of wax, and a larger quantity of inert opaque mineral filler and also containing a few percent of a plaster accelerator.

7. A dry powder adapted to be heated with water to form an impression-taking composition including principally agar agar fine enough to pass a 110-mesh sieve but not fine enough to lump, about one-third as much friable flakes of wax, and a larger quantity of inert opaque mineral filler, and also containing a few percent of an aluminum sulphate and a little soap.

8. The process of making a powder adapted to be mixed with water to make an impression-making plastic which consists in grinding agar agar, sifting to obtain that which passes 80-mesh and will not lump, mixing with comminuted wax having a melting point materially above 132° F., and mixing with opaque filler.

PAUL POETSCHKE.